United States Patent
Uji (10) Patent No.: US 12,480,281 B2
(45) Date of Patent: Nov. 25, 2025

(54) CONSTRUCTION MACHINE

(71) Applicant: Hitachi Construction Machinery Co., Ltd., Tokyo (JP)

(72) Inventor: Katsumasa Uji, Tsukuba (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 18/685,773

(22) PCT Filed: Mar. 27, 2023

(86) PCT No.: PCT/JP2023/012181
§ 371 (c)(1),
(2) Date: Sep. 25, 2024

(87) PCT Pub. No.: WO2023/190329
PCT Pub. Date: Oct. 5, 2023

(65) Prior Publication Data
US 2025/0043542 A1    Feb. 6, 2025

(30) Foreign Application Priority Data
Mar. 28, 2022   (JP) ................................ 2022-052534

(51) Int. Cl.
*E02F 9/22*    (2006.01)
*E02F 9/20*    (2006.01)
(Continued)

(52) U.S. Cl.
CPC .......... *E02F 9/2203* (2013.01); *E02F 9/2004* (2013.01); *E02F 9/2033* (2013.01);
(Continued)

(58) Field of Classification Search
CPC ............ E02F 9/20; E02F 29/2285; E02F 9/24
See application file for complete search history.

(56) References Cited

U.S. PATENT DOCUMENTS

| | | | |
|---|---|---|---|
| 2013/0243557 A1* | 9/2013 | Hiroki ..................... | B60L 50/40 414/687 |
| 2019/0024342 A1* | 1/2019 | Yoshida ................ | B60W 20/17 |
| 2024/0254728 A1* | 8/2024 | Fukuchi ................ | F15B 21/087 |

FOREIGN PATENT DOCUMENTS

| | | |
|---|---|---|
| EP | 3 677 804 A1 | 7/2020 |
| JP | 2000-104291 A1 | 4/2000 |

(Continued)

OTHER PUBLICATIONS

International Search Report (PCT/ISA/210) issued in PCT Application No. PCT/JP2023/012181 dated May 30, 2023 with English translation (5 pages).

(Continued)

*Primary Examiner* — Abiy Teka
(74) *Attorney, Agent, or Firm* — Crowell & Moring LLP (57) ABSTRACT

A construction machine is provided which includes a plurality of hydraulic actuators, a hydraulic pump that discharges pressurized fluid for driving the hydraulic actuators, an engine that drives the hydraulic pump, a plurality of operation lever devices that operate the corresponding hydraulic actuators, a key switch that starts the engine, a speed sensor that senses a rotational speed of the engine, a plurality of operation sensors that sense operation of the corresponding operation lever devices, and a controller that drives, in response to operation of the operation lever devices, the corresponding hydraulic actuators. The controller decides, on the basis of signals from the key switch, the speed sensor, and the plurality of operation sensors, whether operation of the operation lever device is first time operation after start of the engine, and limits, in a case where the operation of the operation lever device is first time operation after start of the engine, the action speed of the hydraulic actuator.

6 Claims, 8 Drawing Sheets

(51) Int. Cl.
  *E02F 9/24* (2006.01)
  *E02F 9/26* (2006.01)
  *F15B 15/20* (2006.01)
  *F15B 21/00* (2006.01)

(52) U.S. Cl.
  CPC .............. *E02F 9/2271* (2013.01); *E02F 9/24* (2013.01); *E02F 9/26* (2013.01); *F15B 15/204* (2013.01); *F15B 21/00* (2013.01); *E02F 9/2285* (2013.01); *E02F 9/2292* (2013.01)

(56) References Cited

FOREIGN PATENT DOCUMENTS

| | | |
|---|---|---|
| JP | 2006-144296 A | 6/2006 |
| JP | 2021 110136 A | 8/2021 |
| WO | WO 2019/044665 A1 | 3/2019 |

OTHER PUBLICATIONS

Japanese-language Written Opinion (PCT/ISA/237) issued in PCT Application No. PCT/JP2023/012181 dated May 30, 2023, with English translation (5 pages).
International Preliminary Report on Patentability (PCT/IB/338 & PCT/IB/373) issued in PCT Application No. PCT/JP2023/012181 dated Oct. 10, 2024, including English translation of document C2 (Japanese-language Written Opinion (PCT/ISA/237), filed on Feb. 22, 2024) (5 pages).

* cited by examiner

CONSTRUCTION MACHINE

TECHNICAL FIELD

The present invention relates to a construction machine such as a hydraulic excavator.

BACKGROUND ART

In a construction machine such as a hydraulic excavator, a plurality of operation lever devices are used to operate individually corresponding actuators. The corresponding relationship (hereinafter referred to as operation assignments) between operation lever devices and actuators differs among different manufacturers of construction machines. Therefore, for example, when an operator uses a construction machine of a manufacturer different from that of a construction machine accustomed to use by the operator, there is the possibility that the operator may perform a wrong operation in a case where the operator does not grasp that the operation assignments are different.

Meanwhile, a construction machine having a changing function of operation assignments is known in which a selected operation assignment is displayed on a monitor and start of running is permitted on condition that an operator performs a response operation indicating that the displayed operation assignment is confirmed (Patent Document 1).

PRIOR ART DOCUMENT

Patent Document

Patent Document 1: JP-2006-144296-A

SUMMARY OF THE INVENTION

Problem to be Solved by the Invention

However, even if the technology of Patent Document 1 is applied, if the operator performs a response operation without confirming the operation assignment, then the construction machine is placed into a state in which it can be run while the operator does not grasp the operation assignment, and a wrong operation is not necessarily be suppressed sufficiently.

The object of the present invention resides in provision of a construction machine that can suppress a wrong operation arising from false recognition of an operation assignment.

Means for Solving the Problem

In order to achieve the object described above, the present invention provides a construction machine including a plurality of hydraulic actuators, a hydraulic pump that discharges pressure fluid for driving the plurality of hydraulic actuators, an engine that drives the hydraulic pump, a plurality of operation lever devices that operate the corresponding hydraulic actuators, a key switch that starts the engine, a speed sensor that detects a rotational speed of the engine, a plurality of operation sensors that sense operation of the corresponding operation lever devices, and a controller that controls, in response to operation of the operation lever devices, action of a corresponding one of the hydraulic actuators, in which the controller is configured to decide, on the basis of signals from the key switch, the speed sensor, and the plurality of operation sensors, whether operation of an operation lever device is first time operation after start of the engine, and limit, in a case where it is decided that the operation of the operation lever device is first time operation after start of the engine, action speed of the hydraulic actuator.

Advantages of the Invention

With the present invention, a false operation by wrong recognition of an allocation assignment can be suppressed.

MODES FOR CARRYING OUT THE INVENTION

In the following, embodiments of the present invention are described with reference to the drawings.

First Embodiment

Hydraulic Excavator

Figure 1:
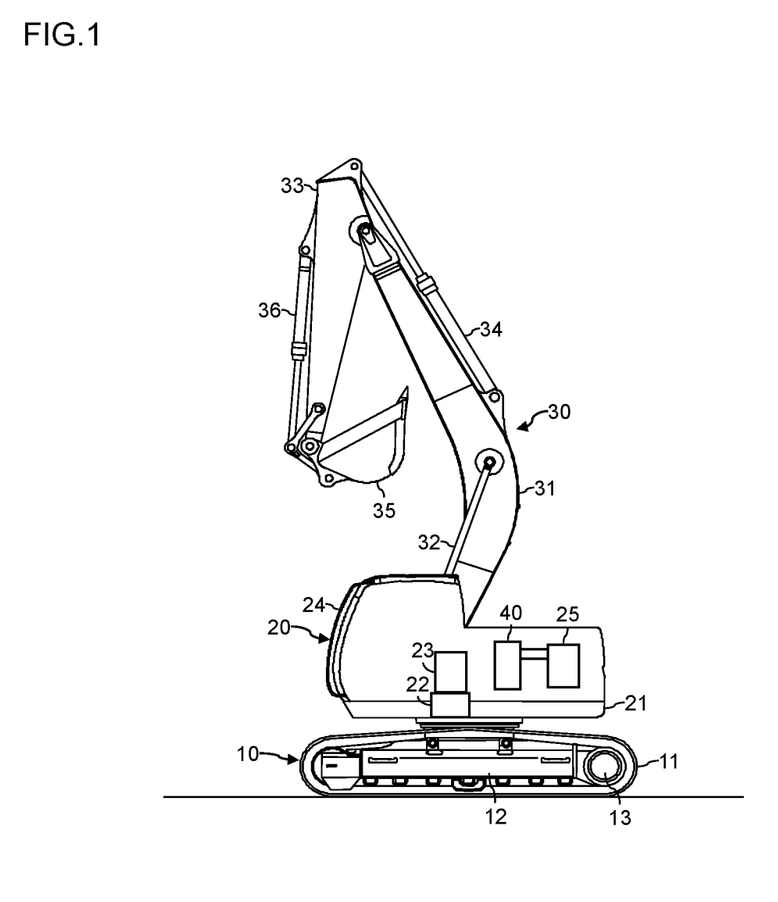
FIG. 1 is a side elevational view of a hydraulic excavator that is an example of a construction machine according to a first embodiment of the present invention.

FIG. 1 is a side elevational view of a hydraulic excavator that is an example of a construction machine according to a first embodiment of the present invention. Referring to FIG. 1, the leftward and rightward direction in the figure is the forward and rearward direction of the hydraulic excavator (accurately, of its swing structure). The hydraulic excavator depicted in FIG. 1 includes a track structure 10, a swing structure 20, a front work implement 30, and so forth.

The track structure 10 includes a pair of left and right crawlers 11 (only one on one side is depicted), crawler frames 12, and so forth. The left and right crawlers 11 individually include a travel driving device 13 such that they can act independently of each other. The travel driving device is configured from a traveling hydraulic motor, a speed reduction mechanism, and so forth.

The swing structure 20 is swingably mounted at an upper portion of the track structure 10 and includes a swing frame 21, a swing mechanism 22, a swing motor 23, a cab 24, an engine 25, and so forth. The swing frame 21 is swingably coupled around a vertical axis to an upper portion of the crawler frames 12. The swing mechanism 22 uses driving force of the swing motor 23 to drive the swing structure 20 (swing frame 21) to swing with respect to the track structure 10. The cab 24 is an operation room for being boarded by an operator in order to operate the hydraulic excavator. The engine 25 is a prime mover of the hydraulic excavator. The cab 24 and the engine 25 are mounted at an upper portion of the swing frame 21. The engine 25 includes a speed sensor 47 (FIG. 3) for detecting the engine speed.

Further, the front work implement 30 is coupled to the swing structure 20 and is configured from a boom 31, a boom cylinder 32, an arm 33, an arm cylinder 34, a bucket 35, a bucket cylinder 36, and so forth. The boom 31 is coupled pivotably in the upward and downward direction with respect to the swing frame 21 by a shaft having a center line extending in the leftward and rightward direction. The boom cylinder 32 is coupled at the opposite ends thereof to the swing frame 21 and the boom 31 such that it is expanded and contracted to drive the boom 31 upwardly and downwardly. The arm 33 is coupled pivotably in the forward and rearward direction to a distal end of the boom 31 by a shaft having a center line extending leftwardly and rightwardly. The arm cylinder 34 is coupled at the opposite ends thereof to the boom 31 and the arm 33 such that it is expanded and contracted to drive the arm 33 forwardly and rearwardly. The bucket 35 is coupled pivotably to a distal end of the arm 33 by a shaft having a center line extending leftwardly and rightwardly. The bucket cylinder 36 is suitably coupled at the opposite ends thereof to the arm 33 and the bucket 35 and is configured to expand and contract to drive the bucket 35. The bucket 35 is an attachment and can be exchanged to a different attachment such as a breaker or a grapple.

Furthermore, on the swing structure 20 (swing frame 21), a hydraulic system configured from a hydraulic pump 40, a flow rate control valve 42 (FIG. 2), and so forth is mounted. The hydraulic pump 40 is a hydraulic source and is configured to discharge pressurized fluid for driving a plurality of hydraulic actuators such as a traveling hydraulic motor, the swing motor 23, the boom cylinder 32, the arm cylinder 34, the bucket 35, and the bucket cylinder 36. This hydraulic pump 40 is driven by the engine 25. The flow rate control valve 42 is a valve unit configured from a plurality of directional control valves that control flow (direction and flow rate) of pressurized fluid to be supplied to the hydraulic actuators. The plurality of directional control valves configuring the flow rate control valve 42 are of the hydraulically driven type driven by pilot pressure that acts upon a pressure receiving chamber. For example, in a case where a three-position selector valve is adopted, the directional control valves are each provided in a corresponding relationship to each one of the hydraulic actuators of a driving target.

Further, in the inside of the cab 24, left and right operation lever devices 26 and 27 (FIG. 2) are arranged. The operation lever devices 26 and 27 are of the cross operation type and individually include a first operation lever device operated so as to be tilted forwardly and rearwardly and a second operation lever device operated so as to be tilted leftwardly and rightwardly such that an operation lever is used in common by the first operation lever device and the second operation lever device. The operation lever devices 26 and 27 are arranged on the left and right of a driver's seat in the inside of the cab 24. The operation lever devices 26 and 27 operate the hydraulic actuators (the swing motor 23, the boom cylinder 32, the arm cylinder 34, and the bucket cylinder 36).

In addition, in the inside of the cab 24, a key switch 29 (FIG. 3) for switching a power supply to the hydraulic excavator between on and off and starting the engine 25, a gate lock lever (not depicted), and a monitor 70 (FIG. 3) are arranged. The gate lock ever is a lever for operating a lock lever device that invalidates operation of the hydraulic actuators performed by the operation lever devices 26 and 27. The gate lock lever is installed on the getting on/off side of the driver's seat and is configured such that, when it is placed in a laid down state, it disturbs the operator from getting off, and, when it is raised to open the boarding gate for the driver's seat, it allows the operator to get off.

Hydraulic System

Figure 2:
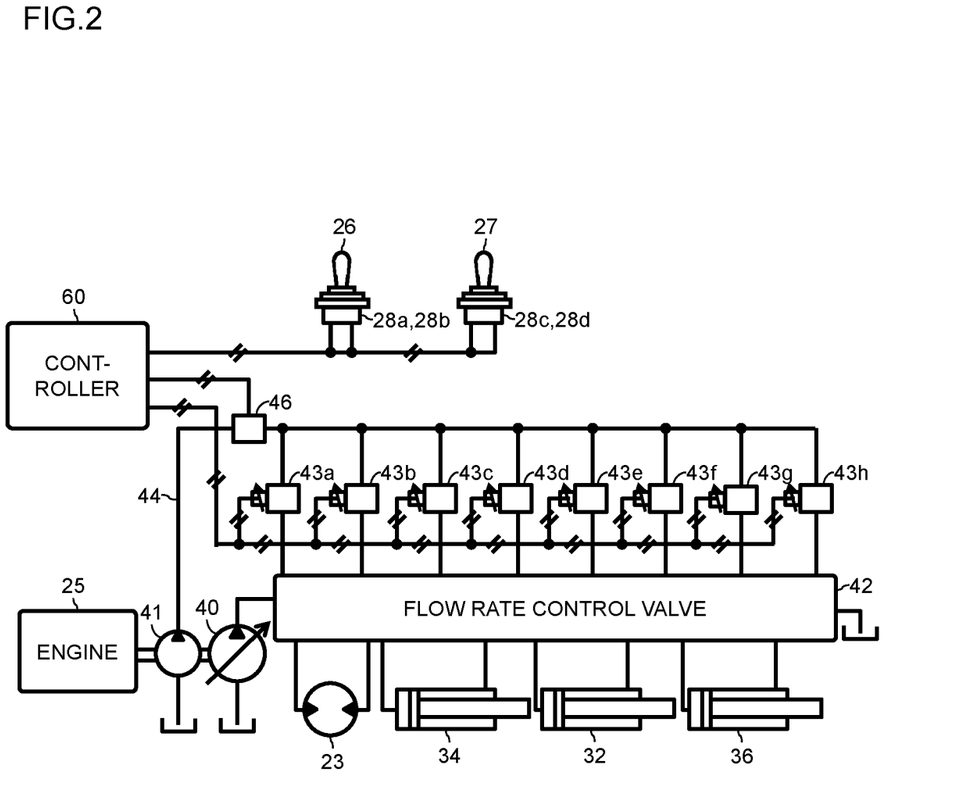
FIG. 2 is a circuit diagram depicting essential part of a hydraulic system provided in the construction machine according to the first embodiment of the present invention.

FIG. 2 is a circuit diagram depicting essential part of the hydraulic system provided in the construction machine according to the first embodiment of the present invention.

As depicted in FIG. 2, the operation lever devices 26 and 27 are of the electric type. Operation (operation direction and operation amount) of each of the operation lever devices 26 and 27 is detected by a plurality of operation sensors 28a to 28d and is outputted to a controller 60. For the operation sensors 28a to 28d, a sensor that detects a tilt direction and a tilt amount of the operation lever such as a rotary encoder or a potentiometer can be adopted. For example, the operation sensor 28a detects operation in the forward and rearward direction of the operation lever device 26, and the operation sensor 28b detects operation in the leftward and rightward direction of the operation lever device 26. The operation sensor 28c detects operation in the forward and rearward direction of the operation lever device 27, and the operation sensor 28d detects operation in the leftward and rightward direction of the operation lever device 27.

The controller 60 outputs a command signal to each of solenoids of solenoid proportional valves (pressure reducing valves) 43a to 43h in response to a lever operation by an operator on the basis of signals from the operation sensors 28a to 28d. The solenoid proportional valves 43a to 43h are provided on a pilot line 44 that connects a pilot pump 41 and pressure receiving chambers of the directional control valves of the flow rate control valve 42 (at branch portions connecting to the pressure receiving chambers). Each of the solenoid proportional valves 43a to 43h reduces the pressure of pressurized fluid discharged from the pilot pump 41 to generate pilot pressure such that the generated pilot pressure acts upon the pressure receiving chambers of the corresponding directional control valves to drive the directional control valves in a direction according to the operation.

For example, the solenoid proportional valves 43a and 43b are connected to the corresponding pressure receiving chambers of the directional control valve for the swing motor 23. If pilot pressure is outputted from the solenoid proportional valve 43a, then the spool of the directional control valve for the swing motor 23 is moved to one side, whereupon pressurized fluid from the hydraulic pump 40 is supplied to a port on one side of the swing motor 23 to cause the swing motor 23 to rotate forwardly, and thus a rightward swing action is performed. If pilot pressure is outputted from the solenoid proportional valve 43b, then the spool of the directional control valve for the swing motor 23 is moved to the other side, whereupon pressurized fluid from the hydraulic pump 40 is supplied to the port on the other side of the swing motor 23 to cause the swing motor 23 to rotate reversely, and thus a leftward swing action is performed.

The solenoid proportional valves 43c and 43d are connected to the corresponding pressure receiving chambers of the directional control valve for the arm cylinder 34. If pilot pressure is outputted from the solenoid proportional valve 43c, then the spool of the directional control valve for the arm cylinder 34 is moved to one side, whereupon pressurized fluid from the hydraulic pump 40 is supplied to a port on one side of the arm cylinder 34 to cause the arm cylinder 34 to contract, and thus an arm dumping action is performed. If pilot pressure is outputted from the solenoid proportional valve 43d, then the spool of the directional control valve for the arm cylinder 34 is moved to the other side, whereupon pressurized fluid from the hydraulic pump 40 is supplied to the port on the other side of the arm cylinder 34 to cause the arm cylinder 34 to extend, and thus an arm crowding action is performed.

The solenoid proportional valves 43e and 43f are connected to the corresponding pressure receiving chambers of the directional control valve for the boom cylinder 32. If pilot pressure is outputted from the solenoid proportional valve 43e, then the spool of the directional control valve for the boom cylinder 32 is moved to one side, whereupon pressurized fluid from the hydraulic pump 40 is supplied to the port on one side of the boom cylinder 32 to cause the boom cylinder 32 to contract, and thus a boom lowering action is performed. If pilot pressure is outputted from the solenoid proportional valve 43f, then the spool of the directional control valve for the boom cylinder 32 is moved to the other side, whereupon pressurized fluid from the hydraulic pump 40 is supplied to the port on the other side of the boom cylinder 32 to cause the boom cylinder 32 to extend, and thus a boom raising action is performed.

The solenoid proportional valves 43g and 43h are connected to the corresponding pressure receiving chambers of the directional control valve for the bucket cylinder 36. If pilot pressure is outputted from the solenoid proportional valve 43g, then the spool of the directional control valve for the bucket cylinder 36 is moved to one side, whereupon pressurized fluid from the hydraulic pump 40 is supplied to a port on one side of the bucket cylinder 36 to cause the bucket cylinder 36 to extend, and thus a bucket crowding action is performed. If pilot pressure is outputted from the solenoid proportional valve 43h, then the spool of the directional control valve for the bucket cylinder 36 is moved to the other side, whereupon pressurized fluid from the hydraulic pump 40 is supplied to the port on the other side of the bucket cylinder 36 to cause the bucket cylinder 36 to contract, and thus a bucket dumping action is performed.

Further, on the pilot line 44, a lock valve 46 is provided between the solenoid proportional valves 43a to 43h and the pilot pump 41. In the present embodiment, a configuration in which an on-off valve of the electromagnetically driven type is adopted for the lock valve 46 is exemplified. The lock valve 46 configures the lock lever device described hereinabove together with the gate lock lever and the position sensor 45 for the gate lock lever (FIG. 3) and is opened and closed by a command signal outputted from the controller 60 in response to the position of the gate lock lever detected by the position sensor 45.

The controller 60 closes the lock valve 46 in a case where it decides that the gate lock lever is in a raised state on the basis of the position sensor 45. Consequently, supply of pressurized fluid from the pilot pump 41 to the solenoid proportional valves 43a to 43h is cut off, and operation of the hydraulic actuator by the operation lever devices 26 and 27 is invalidated (locked). In this case, the hydraulic actuator is disabled irrespective of whether or not there is operation of the operation lever devices 26 and 27.

In contrast, in a case where the controller 60 decides that the gate lock lever is in a laid down state on the basis of the position sensor 45, then it opens the lock valve 46. Consequently, pressurized fluid flows from the pilot pump 41 to the solenoid proportional valves 43a to 43h to thereby establish a state in which the solenoid proportional valves 43a to 43h can output pilot pressure. Consequently, operation of the hydraulic actuators by the operation lever devices 26 and 27 is validated (unlocked), and in response to operation of the operation lever device 26 and 27, the hydraulic actuators corresponding with them act.

Controller

Figure 3:
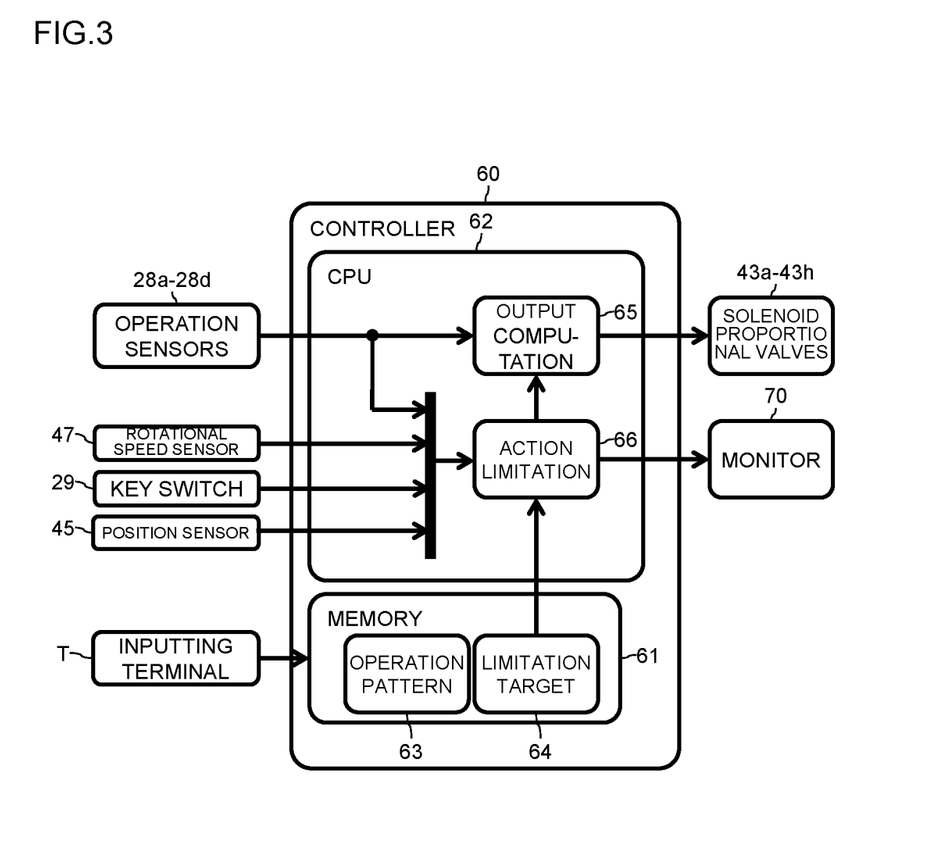
FIG. 3 is a functional block diagram of a controller provided in the construction machine according to the first embodiment of the present invention.

FIG. 3 is a functional block diagram of the controller.

The controller 60 is a machine-carried computer mounted on the hydraulic excavator and includes a memory 61 and a CPU 62. The memory 61 is a storage device such as a RAM, a ROM, an HHD and an SSD that store a program and various data necessary for control of target equipment, temporary data during computation operation, and so forth. The CPU 62 is a processor that executes various computations, control of target equipment, and so forth on the basis of the program and the various data stored in the memory 61.

Memory

In the memory 61, a plurality of operation assignment data 63 are stored. The operation assignment data 63 is data of assignments (operation assignments) of operation of the operation lever devices 26 and 27 to actions of the hydraulic actuators (swing motor 23, boom cylinder 32, arm cylinder 34, and bucket cylinder 36).

An example of the operation assignment data 63 is described. For example, if the operation lever of the left operation lever device 26 is laid down forwardly, then the swing motor 23 is rotated forwardly, and thus a right swing action is performed, but if the operation lever of the left operation lever device 26 is laid down rearwardly, then the swing motor 23 is rotated reversely, and thus a left swing action is performed. In addition, if the operation lever of the left operation lever device 26 is laid down leftwardly, then the arm cylinder 34 is contracted, and thus an arm dumping action is performed, but if the operation lever of the left operation lever device 26 is laid down rightwardly, then the arm cylinder 34 is extended, and thus an arm crowding action is performed. If the operation lever of the right operation lever device 27 is laid down forwardly, then the boom cylinder 32 is contracted, and thus a boom lowering action is performed, but if the operation lever of the right operation lever device 27 is laid down rearwardly, then the boom cylinder 32 is extended, and thus a boom raising action is performed. Moreover, if the operation lever of the right operation lever device 27 is laid down leftwardly, then the bucket cylinder 36 is extended, and thus a bucket crowding action is performed, but if the operation lever of the right operation lever device 27 is laid down rightwardly, then the bucket cylinder 36 is contracted, and thus a bucket dumping action is performed. A plurality of such operation assignment data 63 that define such a relationship between operation of the operation lever devices 26 and 27 and actions of the hydraulic actuators are stored in the memory 61.

Further, the memory 61 also has limitation target data 64 storable therein. The limitation target data 64 is data that defines, in regard to limitation (action limitation 66 hereinafter described) of an action speed of a hydraulic actuator, a target hydraulic actuator and an action direction of the target hydraulic actuator that become a limitation target. This limitation target data 64 is configured such that a target hydraulic actuator and an action direction of the target hydraulic actuator, such as forward rotation and reverse rotation (rightward swing and leftward swing) of the swing motor 23 or contraction (arm dumping) of the arm cylinder 34, can be optionally selected and set while the degree of influence of a wrong operation being considered, for example.

It is to be noted that the limitation target data 64 can be made subject to rewriting, deletion, addition, or the like through an inputting terminal T connected to the controller 60. Also for the operation assignment data 63, rewriting, deletion, addition, or the like is performed through the inputting terminal T connected to the controller 60. However, operation for selecting one of the plurality of operation assignment data 63 stored in the memory 61 can be performed by an operator or the like through an inputting device (for example, the monitor 70) installed in the cab 24.

CPU

Further, the CPU 62 executes functions of output computation 65, action limitation 66, and so forth in accordance with a program stored in the memory 61.

The output computation 65 is a function for driving, in response to operation of the operation lever devices 26 and 27, corresponding hydraulic actuators. As described hereinabove, signals according to operation of the operation lever devices 26 and 27 are inputted from the operation sensors 28a to 28d to the controller 60. The CPU 62 computes, by the function of the output computation 65, command signals (current values) according to the signals from the operation sensors 28a to 28d, and outputs the command signals to the corresponding solenoid proportional valves 43a to 43h. At this time, the corresponding relationship between the operation direction of the operation lever device 26, 27 and the output destination (solenoid proportional valve 43a to 43h) of the command signal generated in response to the operation depends upon the operation assignment data 63 selected currently.

The action limitation 66 is a function for limiting, in a case where the operation lever device 26, 27 is operated, the action speed of the hydraulic actuator, which action speed depends on the operation of the operation lever device 26, 27, under a fixed condition. Under the function, the CPU 62 decides, in a case where the operation lever device 26, 27 is operated, whether or not the operation is first time operation after start of the engine 25, and limits, if the operation is first time operation after start of the engine 25, the action speed of the hydraulic actuator, which action speed depends on the operation of the operation lever device 26, 27. At this time, the CPU 62 decides, on the basis of signals from the key switch 29, speed sensor 47, and operation sensors 28a to 28d, whether the operation of the operation lever device 26, 27 is first time operation after start of the engine 25. Further, the limitation of the action speed is performed by a method in which a preset limit value (upper limit value) to the action speed (for example, command signals to the solenoid proportional valves 43a to 43h) is set and the hydraulic actuator does not act at a speed exceeding the limit value. In particular, although, in a state in which the function of the action limitation 66 is operative, the hydraulic actuator acts at a speed according to the operation if the operation is a small amount operation of a predetermined operation amount or less, even if operation exceeding the predetermined operation amount is performed, the hydraulic actuator acts only with the limit value (very low moving speed).

Further, as part of the function of the action limitation 66, the CPU 62 decides whether or not the operation of the operation lever device is first time operation (operation performed for the first time) performed after an invalidation state is cancelled after the invalidation state of operation of a hydraulic actuator by a lock lever device has continued exceeding a preset time period. Further, the CPU 62 decides whether or not a no-operation state of the operation lever device 26, 27 (neutral state of the operation device without being tilted) has continued for more than the preset time period. In a case where the operation of the operation lever device 26, 27 is first time operation performed after the invalidation state is cancelled after the invalidation state has continued for more than the preset time period or in a case where the operation of the operation lever device 26, 27 is first time operation after the no-operation state has continued for more than the preset time period, the CPU 62 limits the action speed of the hydraulic actuator, which action speed depends on the operation of the operation lever device. The method for limitation of the action speed of the hydraulic actuator in such cases as described above is similar to that in a case of first time operation after start of the engine 25.

It is to be noted that, in the case of the present embodiment, the limitation target data 64 is stored in the memory 61 as described hereinabove, and the CPU 62 executes the action limitation 66 only in a case where operation corresponding to the action registered in the limitation target data 64 is performed. In other words, for example, in the action limitation 66 executed at the time of first time operation after start of the engine, in a case where a target hydraulic actuator set in the limitation target data 64 is operated for the first time after start of the engine, the action speed of the target hydraulic actuator is limited. This similarly applies also to the action limitation 66 that is executed at the time of first time operation performed after an operation invalidation state has continued or executed at the time of operation performed while a no-operation state has continued. If bidirectional actions of all of the swing motor 23, boom cylinder 32, arm cylinder 34, and bucket cylinder 36 are registered in the limitation target data 64, then the function of the action limitation 66 can be applied uniformly to all operation of the operation lever devices 26 and 27.

Further, as part of the function of the action limitation 66, the CPU 62 outputs, during limitation of the action speed of a hydraulic actuator, information about the action speed of the hydraulic actuator being limited to the monitor 70 so as to be displayed to thereby notify an operator that the function of the action limitation 66 is being executed.

Action Command

Figure 4:
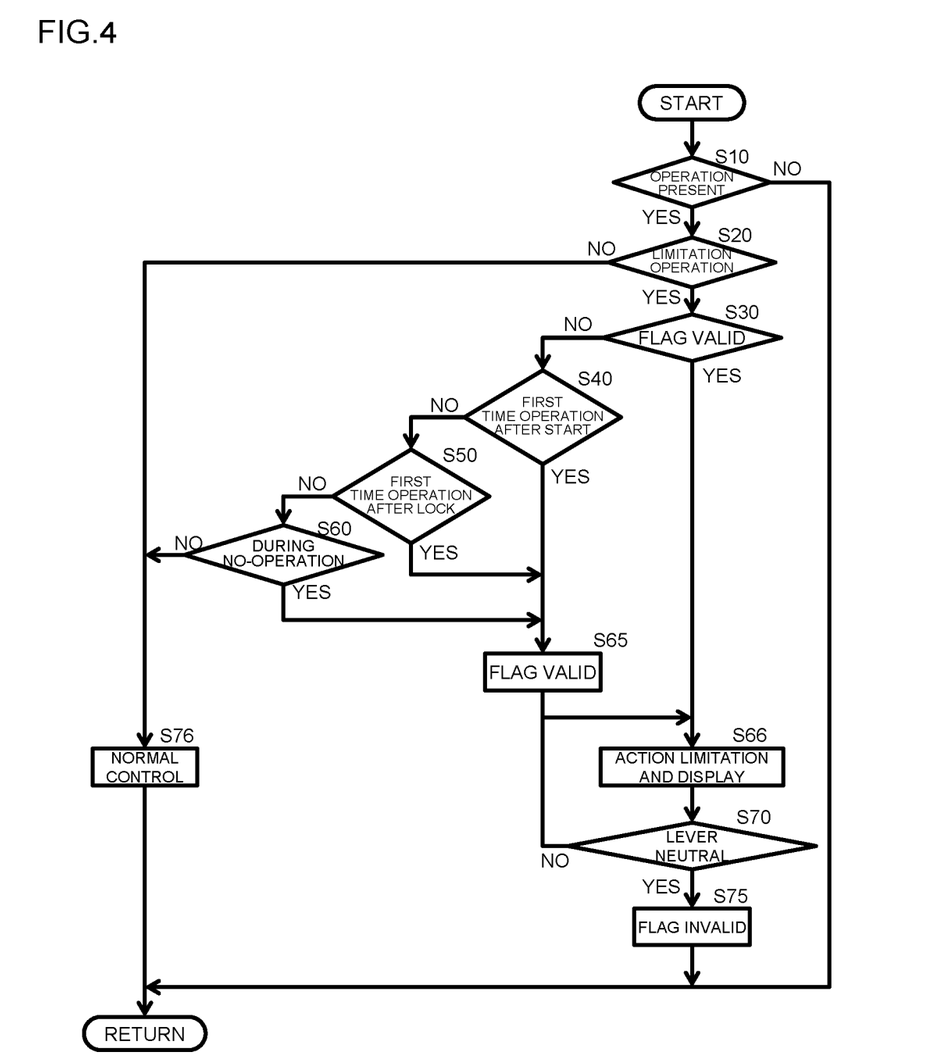
FIG. 4 is a flow chart depicting a process for action command to a hydraulic actuator in the construction machine according to the first embodiment of the present invention.

FIG. 4 is a flow chart depicting a process for action command to a hydraulic actuator by the controller 60. The controller 60 repetitively executes the flow of FIG. 4 while it is energized.

Step S10

During execution of the flow of FIG. 4, the controller 60 decides first in step S10 whether operation by the operation lever device 26, 27 is being performed on the basis of signals of the operation sensors 28*a* to 28*d*. Whether operation is being performed is decided depending upon whether operation exceeding a preset operation amount set in advance is performed (for example, operation exceeding a dead zone). The setting of the preset operation amount is adjusted to prevent such wrong decision that, although an intentional operation is not performed, operation is being performed because of fluctuation of the operation decision value that is caused by vibration of the hydraulic excavator, an electric disturbance, or the like. In a case where the controller 60 decides that none of the operation lever devices 26 and 27 are being operated, it returns the process to step S10 and repeats the process in step S10 until at least one of the operation lever devices 26 and 27 is operated. In a case where the controller 60 decides that at least one of the operation lever devices 26 and 27 is being operated in at least one of the forward, rearward, leftward, and rightward directions, the controller 60 advances the process from step S10 to step S20.

Step S20

In a case where the process is advanced to step S20, the controller 60 decides whether the operation being currently performed (in a case where a plurality of different operation are being performed, any one of the operation) is a limitation operation. Whether the operation is a limitation operation is decided depending upon whether the operation is assigned to an action registered in the limitation target data 64 under the operation assignment data 63 currently selected. For example, in a case where a boom raising action is registered as the limitation target data 64, the decision in step S20 is satisfied when there is a boom raising action (in the example described above, a rearwardly tilting operation of the operation lever device 27) in the operation assignment data 63 currently selected. In a case where the operation being currently performed is not a limitation operation, the controller 60 advances the process from step S20 to step S76, but in a case where the operation being currently performed is a limitation operation, the controller 60 advances the process from step S20 to step S30.

Step S30

In a case where the process is advanced to step S30, the controller 60 decides whether an action limitation flag is on (valid). The action limitation flag is a prerequisite for execution of the function of the action limitation 66, and only in a case where the action limitation flag is on, the function of the action limitation 66 is executed. In a case where the action limitation flag is on, the controller 60 advances the process from step S30 to step S66, but in a case where the action limitation flag is off, the controller 60 advances the process from step S30 to step S40.

Step S40

In a case where the process is advanced to step S40, the controller 60 decides, on the basis of signals of the operation sensors 28*a* to 28*d*, key switch 29, and speed sensor 47, whether the operation being currently performed is first time operation after start of the engine. An algorithm for deciding whether the operation is first time operation after start of the engine in step S40 is hereinafter described with reference to FIG. 5. In a case where the operation being currently performed is first time operation after start of the engine, the controller 60 advances the process from step S40 to step S65, but in a case where the operation being currently performed is not first time operation, the controller 60 advances the process from step S40 to step S50.

Step S50

In a case where the process is advanced to step S50, the controller 60 decides, on the basis of a signal of the position sensor 45, whether the operation being currently performed (limitation operation) is first time operation performed after an invalidation state of operation of the hydraulic actuator by the lock lever device has continued exceeding a preset time period. The preset time period is a value set in advance and stored in the memory 61 and is a value of, for example, one minute, five minutes, or the like. This preset time period can be made changeable by an operator through an inputting device (for example, the monitor 70) installed in the cab 24. In a case where the operation being currently performed is first time operation after the operation invalidation state has continued exceeding the preset time period, the controller 60 advances the process from step S50 to step S65. In a case where the operation being currently performed is not first time operation after the operation invalidation state has continued exceeding the preset time period, the controller 60 advances the process from step S50 to step S60.

Step S60

In a case where the process is advanced to step S60, the controller 60 decides whether or not a no-operation state of the operation lever device 26, 27 has continued exceeding a preset time period. The preset time period to be used in this decision is a numerical value such as a value (for example, one minute or five minutes) set in advance and stored in the memory 61, and may be a value equal to that of the preset time period to be used for the decision in step S50 or may be a different value. Also this preset time period can be made changeable by an operator through the inputting device (for example, the monitor 70) installed in the cab 24. If the operation being currently performed is not first time operation after the no-operation state has continued exceeding the preset time interval, then the controller 60 advances the process from step S60 to step S76. If the operation being currently performed is first time operation after the no-operation state has continued exceeding the preset time interval, then the controller 60 advances the process from step S60 to step S65.

Step S65

In a case where the process is advanced to step S65, the controller 60 sets the action limitation flag to on (valid) and advances the process to step S66. In particular, even if the action limitation flag is off (invalid) at the point of time of step S30, if the decision in any one of steps S40, S50, and S60 is satisfied, then the action limitation flag is set to on (validated).

Step S66

After the process is advanced to step S66 (that is, in a case where a limitation operation is performed and besides the action limitation flag is on), the controller 60 executes the function of the action limitation 66 described hereinabove and controls the monitor 70 to display that the action limitation operation is being executed. Consequently, even if the operation being currently performed (limitation function) is operation exceeding the predetermined operation amount, the corresponding hydraulic actuator acts not at a speed according to the operation amount but at a limited lower speed.

Step S70

During execution of the function of the action limitation 66, the controller 60 decides, on the basis of signals of the operation sensors 28a to 28d, whether the operation lever being currently operated (in a case where both of the operation lever devices 26 and 27 are being operated, both operation levers) has returned to the neutral position. Whether the operation lever has returned to the neutral position is decided depending upon whether the operation amount has returned to the operation amount having been used in the decision in step S10 and equal to or lower than the preset operation amount. While the current operation continues, the controller 60 repetitively executes step S66 to continue the execution of the function of the action limitation 66. If the operation lever being currently operated returns to the neutral position, then the controller 60 stops the execution of the function of the action limitation 66 and the displaying output about this on the monitor 70, and advances the process from step S70 to S75.

Step S75

After the process is advanced to step S75, the controller 60 sets the action limitation flag to off (invalid) and advances the process to step S76 to return the process to step S10.

Step S76

In a case where the process is advanced to step S76, the controller 60 controls, in response to operation of the operation lever device 26, 27, a corresponding hydraulic actuator without executing the function of the action limitation 66. Although partly omitted, during this normal control, the controller 60 decides whether the operation lever being currently performed returns to its neutral position in a similar manner as in step S70, and returns the process to step S10 if the operation lever being currently operated returns to the neutral position. Accordingly, except a situation where the decision in any one of steps S40, S50, and S60 is satisfied and the action limitation flag is changed to on, the process is advanced to step S76 and normal control is executed in a case where the operation lever device 26, 27 is operated.

Post Engine Start First Time Operation Decision

Figure 5:
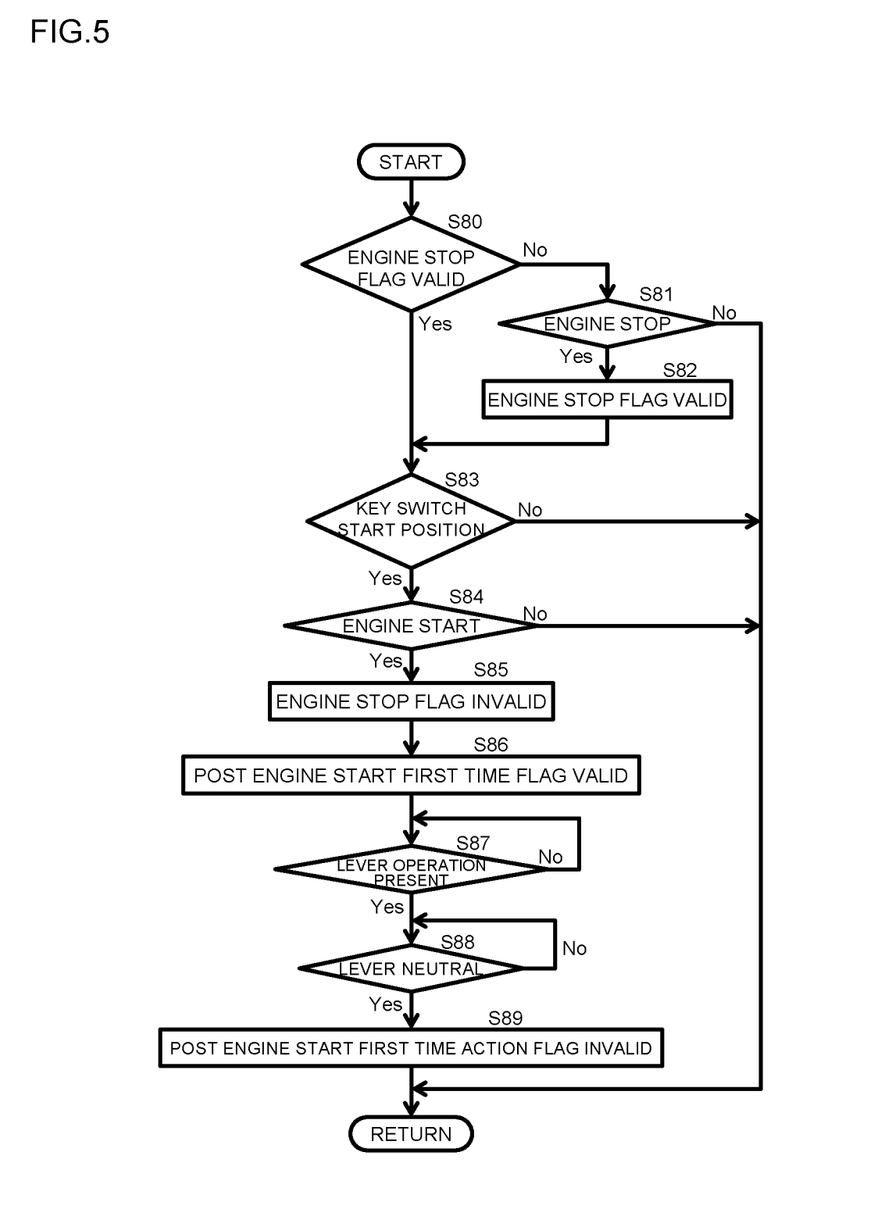
FIG. 5 is a flow chart depicting a process for post engine start first time operation decision in the construction machine according to the first embodiment of the present invention.

FIG. 5 is a flow chart depicting a process for post engine start first time operation decision by the controller 60. The controller 60 repetitively executes the flow of FIG. 5, while it is energized, in parallel to the flow of the action command described with reference to FIG. 4 to discriminate whether the operation being currently performed is first time operation after start of the engine. The decision in step S40 described with reference to FIG. 4 is performed on the basis of the discrimination by the flow of FIG. 5.

Step S80

During execution of the flow of FIG. 5, the controller 60 first decides in step S80 whether an engine stop flat is on (valid). The engine stop flag is a flag that is set to on in a case where it is decided in step S81 that the engine speed is 0, that is, that the engine 25 is in a stopping state. In a case where the engine stop flag is on, the controller 60 advances the process from step S80 to step S83, but in a case where the engine stop flag is off, the controller 60 advances the process from step S80 to step S81.

Step S81

In a case where the process is advanced to step S81, the controller 60 decides on the basis of a signal of the speed sensor 47 whether the engine speed is 0, that is, whether the engine 25 is in a stopping state. In a case where the controller 60 decides that the engine speed is higher than 0 and the engine is operating, the controller 60 ends the current cycle of the process of FIG. 5 and advances the process to step S80 of a next cycle. In a case where the controller 60 decides that the engine speed is 0 and the engine is in a stopping state, the controller 60 advances the process from step S81 to step S82.

Step S82

In a case where the process is advanced to step S82, the controller 60 sets the engine stop flag to on and stores the setting into the memory 61, and advances the process to step S83.

Step S83

After the process is advanced to step S83, the controller 60 decides on the basis of a signal of the key switch 29 whether the key switch 29 is at a START position. The START position of the key switch 29 is a position for performing cranking at the time of start of the engine and can be used for decision of whether operation for start of the engine is being performed. In a case where the key switch 29 is not at the START position, the controller 60 ends the current cycle of the process of FIG. 5 and advances the process to step S80 of a next cycle. In a case where the key switch 29 is in the START position, the controller 60 advances the process from step S83 to step S84.

Step S84

After the process is advanced to step S84, the controller 60 decides on the basis of a signal of the speed sensor 47 whether the engine 25 has been started. Whether the engine 25 has been started can be decided depending upon whether the engine speed detected by the speed sensor 47 has reached a preset engine speed set in advance or more. As an example, at the time where the cranking rotational speed by a starter motor has exceeded the engine speed, it can be decided that the engine 25 has been started. In a case where the engine 25 does not start as yet, the controller 60 ends the current cycle of the process of FIG. 5 and advances the process to step S80 of a next cycle. In a case where the engine 25 has been started, the controller 60 advances the process from step S84 to step S85.

Step S85

After the process is advanced to step S85, the controller 60 sets the engine stop flag to off (invalid) and stores the setting into the memory 61, and advances the process to step S86.

Step S86

After the process is advanced to step S86, the controller 60 sets the post engine start first time flag to on (valid) and stores the setting into the memory 61, and advances the process to step S87.

Step S87

After the process is advanced to step S87, the controller 60 decides on the basis of signals of the operation sensors 28a to 28d whether operation by the operation lever device 26, 27 (limitation operation) is being performed. This decision is executed, for example, in a similar way as in the decision in steps S10 and S20 of FIG. 4. If the operation is not being performed, then the controller 60 repetitively executes the process in step S87 until operation is performed. In a case where operation is performed, the controller 60 advances the process from step S87 to step S88.

Step S88

After the process is advanced to step S88, the controller 60 decides on the basis of signals of the operation sensors 28a to 28d whether the operation lever of the operation lever device 26, 27 being currently operated has been returned to the neutral position. This decision is executed, for example, in a similar manner as in the decision in step S70 of FIG. 4. If the operation lever being currently operated has not been returned to the neutral position, then the controller 60 repetitively executes the process in step S88 until the operation lever returns to the neutral position. If the operation lever being currently operated returns to the neutral position, then the controller 60 advances the process from step S88 to step S89.

Step S89

After the process is advanced to step S89, the controller 60 sets the post engine start first time flag to off (invalid) and stores the setting into the memory 61, and ends the current cycle of the process of FIG. 5 and advances the process to step S80 of a next cycle.

The decision in step S40 of FIG. 4 is satisfied when the post engine start first time flag is on (valid), that is, in a case where an opportunity comes while the processes from step S86 to step S89 of FIG. 5 are executed. On the other hand, when the post engine start first time flag is off (invalid), that is, in a case where an opportunity for decision in step S40 of FIG. 4 comes while the processes from step S80 to step S86 of FIG. 5 are executed, the decision in step S40 is not satisfied.

Advantageous Effect (1) In the present embodiment, in a case where operation of the operation lever device 26, 27 is first time operation after start of the engine, the action speed of the hydraulic actuator by the operation is limited as described hereinabove. Accordingly, when an operator tries to start running of the hydraulic excavator, even if the operator falsely recognizes an operation assignment, the hydraulic actuator does not act suddenly in response to the operation of the operation lever device 26, 27. Further, from a slow action of the hydraulic actuator, the operator can immediately recognize the operation assignment or the false recognition of the operation assignment. Then, if the operation lever is returned to the neutral once and then performing operation again, then the function of the action limitation 66 is cancelled, and thus the operator can quickly advance to a normal work in which the operation lever device 26, 27 is used while being conscious of the operation assignment. Further, in a case of a model where a function of changing an operation assignment is incorporated as in the case of the present embodiment, if it is known that the operation assignment is different from an operation assignment familiar to the operator, also it is possible to switch the operation assignment to the familiar operation assignment at the point of time.

In this manner, with the present embodiment, a wrong operation arising from false recognition of the operation assignment can be suppressed.

(2) Further, in the present embodiment, regarding operation of the operation lever device 26, 27, the function of the action limitation 66 is not applied uniformly, and only operation corresponding to the limitation target data 64 stored in the memory 61 can be made an application target of the function of the action limitation 66.

For example, it is assumed that there are operation assignments A and B that are partly in common. If a case is assumed in which an operator runs a hydraulic excavator for which the operation assignment A is selected taking the operation assignment A as the operation assignment B, there is the possibility that first time operation after start of the engine may be operation that is common to both of the operation assignments A and B. In this case, there is the possibility also that the operator returns the operation lever to cancel the function of the action limitation 66 and advance to a normal operation without being aware of the false recognition of the operation assignment.

In contrast, in the present embodiment, since it is possible to set an application target of the function of the action limitation 66, for example, if the user oneself selects operation about which the user is to be specifically careful and sets the operation as an application target of the function of the action limitation 66, then it is possible to flexibly perform application to such a case as described above. In a case where all operation of the operation lever devices 26 and 27 are to be made application target operation of the action limitation 66, also it is possible to set all operation as application targets.

However, in a case where the function of the action limitation 66 is to be applied uniformly to all operation of the operation lever devices 26 and 27, the selection setting function of the limitation target data 64 is not always necessary and can be omitted.

(3) In a case where the operation invalidation state by the lock lever device continues for the fixed time period or more, it sometimes occurs that the operator gets off once and meanwhile runs a different work machine, performs confirmation of a work process, changing of various settings, or the like. Also there is a case in which the operator changes while the engine 25 is left operative. In such cases as just described, even if the operation is not first time operation after start of the engine, there is the possibility that a wrong operation arising from false recognition of the operation assignment may occur.

Against this, in the present embodiment, in a case where the operation is first time operation after an operation invalidation state by the lock lever device has continued for more than a preset time period, the action speed of the hydraulic actuator is limited. This makes it possible to effectively suppress also a wrong operation at the time of re-operation after temporary absence of the operator or at the time of change of the operator.

Further, although the effect of wrong operation suppression increases as the preset time period for deciding a situation where an operation invalidation state continues decreases by the execution opportunity of the function of the action limitation 66 being increased, excessive execution of the function of the action limitation 66 may be cumbersome. In contrast, since the setting of the preset time period can be changed by an operator or the like, the balance between the wrong operation suppression effect and the work efficiency can be adjusted by setting the preset time period while taking into consideration a work schedule of the operator oneself, a use situation of the hydraulic excavator, and so forth.

(4) Also in a case where the operation lever device 26, 27 is not operated for a fixed time period or more, there is the possibility that the operator may be performing, for example, confirmation of a work process or the like, and there still is the possibility that a wrong operation by false recognition of the operation assignment may occur.

In contrast, in the present embodiment, in a case where operation is performed while a no-operation time period continues exceeding a preset time period, the action speed of the hydraulic actuator is limited, and by this, a wrong operation can be suppressed effectively similarly as in (3) above.

Further, although the effect of wrong operation suppression increases as the preset time period for deciding a situation where a no-operation time period has continued decreases by the execution opportunity of the function of the action limitation 66 being increased, excessive execution of the function of the action limitation 66 may be cumbersome. In contrast, since also the setting of the preset time period can be changed by an operator or the like, the balance between the wrong operation suppression effect and the work efficiency can be adjusted by the operator oneself setting the preset time period while taking various circumstances into consideration.

(5) While the function of the action limitation 66 is being executed, this situation is displayed on the monitor 70, and therefore, the operator can recognize from the display of the monitor 70 that the function of the action limitation 66 is operating.

Second Embodiment

Figure 6:
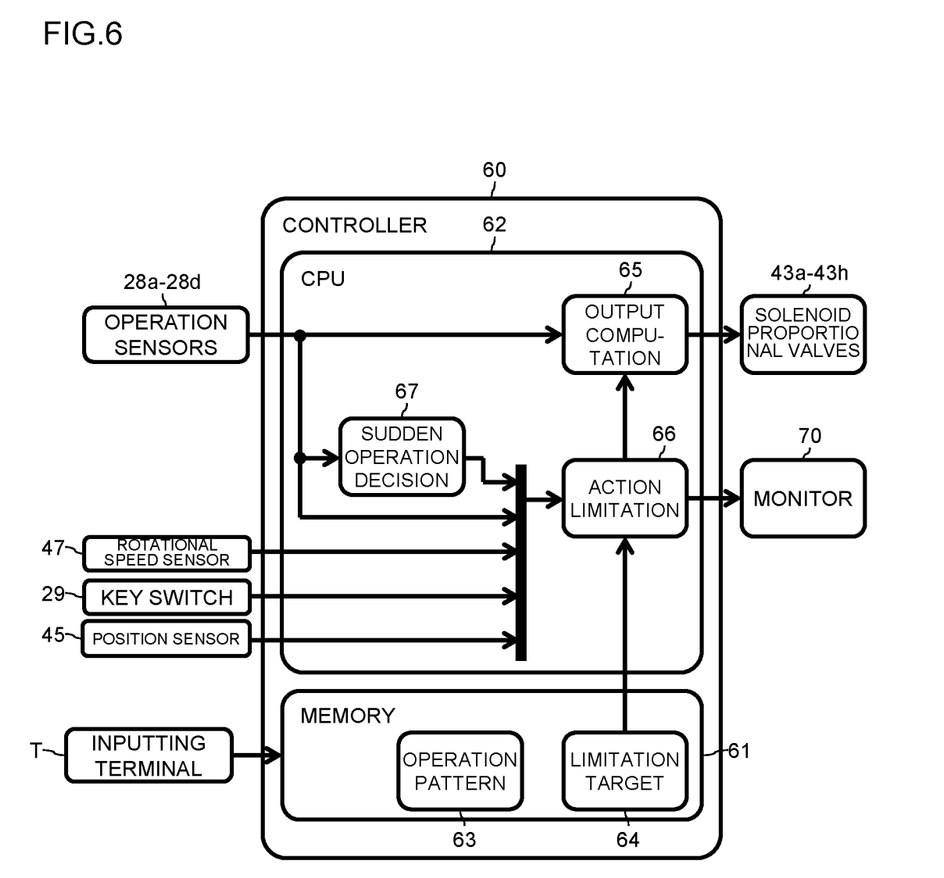
FIG. 6 is a functional block diagram of a controller provided in a construction machine according to a second embodiment of the present invention.

FIG. 6 is a functional block diagram of a controller provided in a construction machine according to a second embodiment of the present invention. In FIG. 6, like or corresponding elements to those in the first embodiment are denoted by the same reference characters as those in the drawings described hereinabove and description of them is omitted.

The difference of the present embodiment from the first embodiment resides in that, also in a situation in which the function of the action limitation 66 is executed in the first embodiment (in a case where the decision in step S40 to S60 is satisfied), if the operation being currently performed is moderate operation, then the action limitation 66 is not applied. In particular, in the present embodiment, the controller 60 additionally has sudden operation decision 67 as a function to be executed by the CPU 62, and by the sudden operation decision 67, it is decided whether the operation is sudden operation.

In the sudden operation decision 67, the controller 60 decides on the basis of signals from the operation sensors 28a to 28d whether the increase rate of the operation amount of the operation lever device 26, 27 is greater than a preset increase rate. In a case where the limitation target data 64 is set, the operation whose increase rate is decided by the sudden operation decision 67 is operation regarding a target hydraulic actuator set in the limitation target data 64. Further, the preset increase rate is set in advance and stored in the memory 61. Only in a case where the increase rate of the operation of the operation lever device 26, 27 is higher than the preset increase rate, the controller 60 determines the operation as an execution target of the function of the action limitation 66, and limits the action speed of the hydraulic actuator only in a case where the decision in step S40 to S60 is satisfied.

Figure 7:
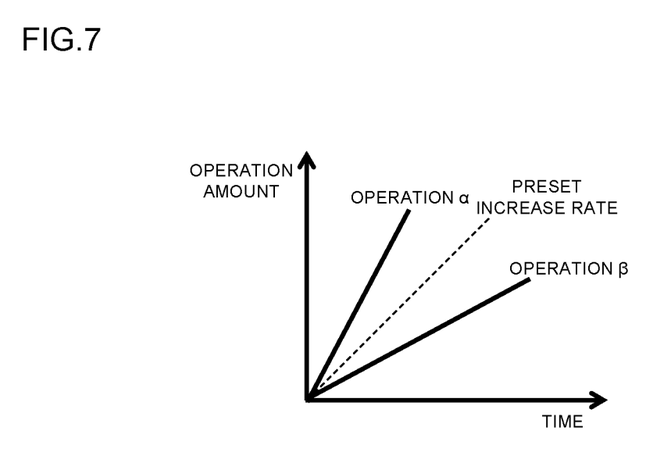
FIG. 7 is a schematic view illustrating sudden operation decision in the construction machine according to the second embodiment of the present invention.

FIG. 7 is a schematic view illustrating sudden operation decision.

As depicted in FIG. 7, whether the operation of the operation lever device 26, 27 by an operator is sudden operation is decided from a degree of the lever operation speed of the operation lever device 26, 27 per unit time (degree of the increase rate of the operation amount). In particular, operation of an increase rate higher than the preset increase rate described above is decided as sudden operation. In FIG. 7, operation α whose increase rate of the operation amount per unit time is higher than the preset increase rate indicated by a broken line is decided as sudden operation, and operation β whose increase rate of the operation amount per unit time is decided as moderate operation.

Figure 8:
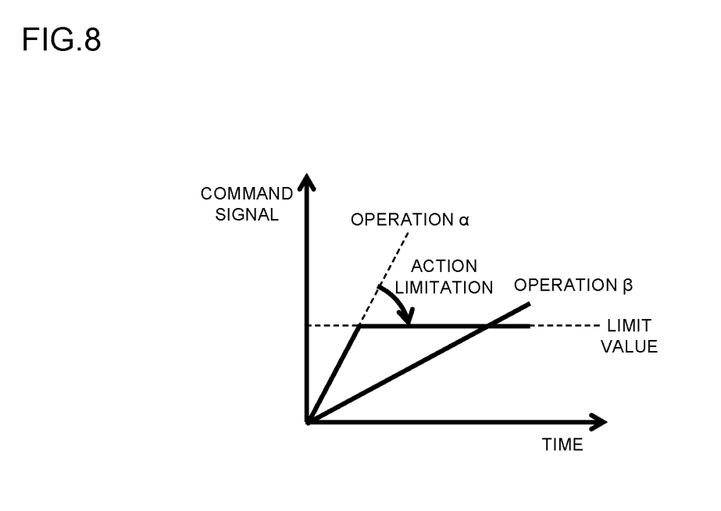
FIG. 8 is a schematic view illustrating action limitation in the construction machine according to the second embodiment of the present invention.

FIG. 8 is a schematic view illustrating action limitation in the present embodiment.

As depicted in FIG. 8, regarding the operation α that is sudden operation, the action limitation 66 is applied in a case where any one of the decision in steps 40 to S60 (FIG. 4) is satisfied. In other words, the command signal to a solenoid proportional valve is limited at a point of time at which the operation amount reaches the preset value, and even if the operation amount increases exceeding the preset value, the command signal to the solenoid proportional valve does not increase from the limit value.

In contrast, regarding the moderate operation β, the action limitation 66 is not applied and a command signal according to the operation amount is outputted even in a case where one of the decision in steps S40 to S60 (FIG. 4) is satisfied. In other words, in a case where the operation amount reaches the preset value with an increase rate lower than the preset increase rate, if the operation amount increases as it is exceeding the preset value, the command signal to the solenoid proportional valve increases exceeding the limit value.

It is to be noted that it is necessary to determine the preset increase rate taking into consideration also a response time period until the hydraulic actuator actually begins to act in response to a lever operation. Further, since there is a difference in the operation sensitivity, the responsiveness of the solenoid proportional valves 43a to 43h, and the responsiveness of the hydraulic actuator depending upon the model, vehicle class, and individual difference of the construction machine, it is preferable to use such a configuration that the preset increase rate can be set by an operator or the like through an inputting device (for example, the monitor 70). Moreover, the responsiveness of the hydraulic actuator is influenced much also by the temperature of hydraulic working fluid. Therefore, also such a configuration is preferable that the temperature of hydraulic working fluid measured by a temperature sensor is inputted to the controller 60 and the controller 60 corrects the preset increase rate in response to the temperature of hydraulic working fluid in accordance with an algorithm set in advance.

Figure 9:
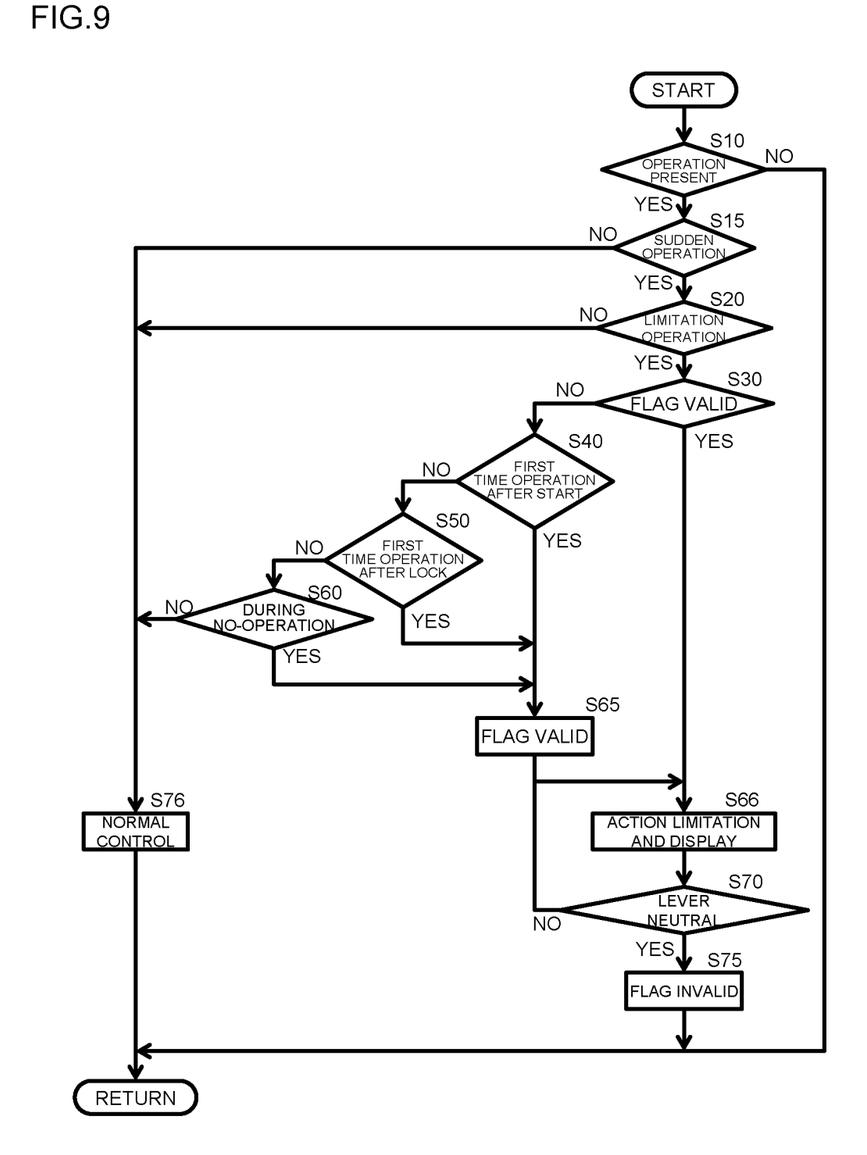
FIG. 9 is a flow chart depicting a process for action command to a hydraulic actuator in the construction machine according to the second embodiment of the present invention.

FIG. 9 is a flow chart depicting a process for action command of a hydraulic actuator by the controller of the present embodiment. The controller 60 repetitively executes the flow of FIG. 9 during energization thereof. FIG. 9 corresponds to FIG. 4 of the first embodiment, and in the flow of FIG. 9, processes same as or corresponding to those of the flow of FIG. 4 are denoted by the same reference characters and description of them is omitted herein.

The difference of the flow of FIG. 9 from the flow of FIG. 4 resides in that a step S15 for deciding sudden operation is interposed between the step S10 and the step S20, and the other processes are similar to those in the flow of FIG. 9 and the flow of FIG. 4.

In particular, in a case where operation of the operation lever device 26, 27 is being performed, the controller 60 advances the process from step S10 to step S15, in which it decides whether the operation is sudden operation as described hereinabove with reference to FIG. 7. If the operation is moderate operation, then the controller 60 advances the process from step S15 to step S76 without performing decision in steps S30 to S60, and executes normal control of the hydraulic actuator according to the operation in step S76. If the operation is sudden operation, then the controller 60 advances the process from step S15 to step S30 to execute decision in steps S30 to S60 similarly as in the first embodiment. Then, if one of such decision is satisfied, then the controller 60 executes the function of the action limitation 66.

Also in the present embodiment, in a case where operation that satisfies the decision in step S40 to S60 is performed, the function of the action limitation 66 is executed, and advantageous effects similar to those by the first embodiment are obtained.

In addition, in a case where the operation is moderate, even if the operation satisfies the decision in step S40 to S60, the operation is exceptionally excluded from an execution target of the function of the action limitation 66 to omit execution of the function of the action limitation 66. In a case of an operator who begins to perform operation carefully by a fine operation, even if the operator does not correctly recognize the operation assignment, there is a tendency that the operator naturally attempts conformation of the operation assignment with a fine operation. To such an operator as just described, it is sometimes cumbersome if the function of the action limitation 66 is executed uniformly based on the decision in step S40 to S60.

Therefore, where the operation is a fine operation, this is excluded from an execution target of the action limitation 66, and only operation that involves an increase rate equal to or higher than a fixed level is made an execution target of the action limitation 66, then the action limitation 66 is eliminated from being applied to a fine operation. Consequently, regarding an operator who is particularly careful for operation, cumbersomeness or incompatibility by application of the action limitation 66 can be moderated.

Modification

Although the foregoing embodiments are described taking a case in which the present invention is applied to a construction machine in which an electric lever device is adopted for the operation lever device 26, 27 as an example, the present invention can be applied also to a construction machine that adopts an operation lever device of the hydraulic type in which a pilot valve is operated by an operation lever. Also among such hydraulic operation lever devices, a hydraulic operation device is available in which the operation assignment can be switched by a selector valve. Also in such a construction machine as just described, for example, if a potentiometer that senses a lever operation amount or a pressure gauge that senses a pilot pressure is used as the operation sensor, then it is possible to decide whether or not execution of the action limitation 66 is permissible similarly to that in the foregoing description. Further, if a pressure reducing valve is provided in the pilot line 44 to reduce the pressurized fluid (original pressure) to be supplied to the pilot valve, then it is possible to apply limitation to the pilot pressure.

Further, although the foregoing description is given taking a case in which the present invention is applied to a construction machine that has a switching function of an operation assignment as an example, the present invention can be applied also to a construction machine that does not have a switching function of an operation assignment. This is because, even with a construction machine in which the operation assignment cannot be switched, for example, at the time when an operator gets on the construction machine first time, the operator may possibly falsely recognize the operation assignment.

Further, although the foregoing description is given taking a case in which a solenoid valve is provided in the lock valve 46 as an example, the present invention can be applied also to a construction machine that adopts a mechanical lock valve linked mechanically to a gate lock lever. Also in this case, if the position of the gate lock lever is sensed by the position sensor 45 and inputted to the controller 60, then it is possible to execute the decision in step S50 (FIG. 4).

Further, although an example in which a limit value is provided to command signals to the solenoid proportional valves 43a to 43h is described as an execution mode of the action limitation 66, also a different mode such as a mode in which a command signal computed in response to an operation amount is multiplied by a coefficient lower than 1 (for example, of approximately 0.1) to reduce the action speed can be adopted appropriately.

Further, although a prime mover is described taking an engine as an example, the prime mover is not limited to an engine, and an electric motor, a fuel cell, or the like may be used as the prime mover. Further, also a combination of them may be used as the prime mover.

DESCRIPTION OF REFERENCE CHARACTERS

23: Swing motor (hydraulic actuator)
25: Engine
26, 27: Operation lever device
28a to 28d: Operation sensor
29: Key switch
32: Boom cylinder (hydraulic actuator)
34: Arm cylinder (hydraulic actuator)
36: Bucket cylinder (hydraulic actuator)
40: Hydraulic pump
46: Lock valve (lock lever device)
47: Speed sensor
60: Controller
61: Memory
70: Monitor

The invention claimed is:

1. A construction machine, comprising:
a prime mover;
a hydraulic pump that is driven by the prime mover to discharge pressurized fluid;
a plurality of hydraulic actuators that act with the pressurized fluid discharged from the hydraulic pump;

a plurality of operation lever devices that operate the hydraulic actuators;
a key switch that starts the prime mover;
a speed sensor that detects a rotational speed of the prime mover;
a plurality of operation sensors that sense operation of the operation lever devices; and
a controller that controls, in response to operation of the operation lever devices, action of a corresponding one of the hydraulic actuators, wherein
the controller is configured to
decide, on a basis of signals from the key switch, the speed sensor, and the plurality of operation sensors, whether or not operation of an operation lever device is first time operation after start of the prime mover, and
limit, in a case where it is decided that the operation of the operation lever device is first time operation after start of the prime mover, action speed of the corresponding one of the hydraulic actuators being operated.

2. The construction machine according to claim 1, wherein
the controller is configured to be capable of setting a respective hydraulic actuator to be made a limitation target from among the hydraulic actuators and an action direction of the respective hydraulic actuator to be made the limitation target.

3. The construction machine according to claim 1, wherein
the controller is configured to decide, on a basis of signals from the operation sensors, whether or not an increase rate of an operation amount of an operation lever device is higher than a preset increase rate, and limit, only in a case where it is decided that the increase rate is higher than the preset increase rate, the action speed of the corresponding one of the hydraulic actuators being operated.

4. The construction machine according to claim 1, wherein
the construction machine includes a lock lever device that invalidates the operation of the corresponding one of the hydraulic actuators, the operation being performed by the operation lever device, and
the controller is configured to
decide whether or not the operation of the corresponding one of the hydraulic actuators is first time operation performed after an invalidation state of the operation of the hydraulic actuator is cancelled after the invalidation state by the lock lever device continues for more than a preset time period, and
limit, in a case where it is decided that the operation of the operation lever device is first time operation performed after the invalidation state is cancelled after the invalidation state continues for more than the preset time period, the action speed of the corresponding one of the hydraulic actuators being operated.

5. The construction machine according to claim 1, wherein
the controller is configured to
decide whether or not a no-operation state of the operation lever device has continued exceeding a preset time period, and
limit, in a case where the no-operation state of the operation lever device being continued for more than the preset time period is decided and the operation of the operation lever device is first time operation performed after the no-operation state of the operation lever device being continued for more than the preset time period, the action speed of the corresponding one of the hydraulic actuators being operated.

6. The construction machine according to claim 1, wherein
the construction machine includes a monitor, and
the controller controls, in a case where the action speed of the corresponding one of the hydraulic actuators being operated is limited, the monitor to display that the action speed of the corresponding one of the hydraulic actuators is limited.

* * * * *